US012027756B2

United States Patent
Jamaly

(10) Patent No.: US 12,027,756 B2
(45) Date of Patent: *Jul. 2, 2024

(54) ANTENNA SYSTEM FOR VEHICLES

(71) Applicant: SWISSCOM AG, Bern (CH)

(72) Inventor: Nima Jamaly, Bern (CH)

(73) Assignee: Swisscom AG (CH)

(*) Notice: Subject to any disclaimer, the term of this patent is extended or adjusted under 35 U.S.C. 154(b) by 3 days.

This patent is subject to a terminal disclaimer.

(21) Appl. No.: 17/743,055

(22) Filed: May 12, 2022

(65) Prior Publication Data
US 2022/0271418 A1 Aug. 25, 2022

Related U.S. Application Data

(63) Continuation of application No. 16/827,889, filed on Mar. 24, 2020, now Pat. No. 11,362,414, which is a
(Continued)

(30) Foreign Application Priority Data

Apr. 29, 2015 (EP) .................................... 15165768

(51) Int. Cl.
H01Q 1/24 (2006.01)
H01Q 1/32 (2006.01)
(Continued)

(52) U.S. Cl.
CPC ........... *H01Q 1/241* (2013.01); *H01Q 1/3225* (2013.01); *H01Q 1/3275* (2013.01); *H01Q 1/50* (2013.01);
(Continued)

(58) Field of Classification Search
CPC ........ H01Q 1/241; H01Q 1/3275; H01Q 1/50; H01Q 13/203; H01Q 1/242; H01Q 1/3225;
(Continued)

(56) References Cited

U.S. PATENT DOCUMENTS 5,548,835 A * 8/1996 Sasaki .................. H04B 7/0805
455/66.1
6,380,910 B1 4/2002 Moustakas
(Continued)

FOREIGN PATENT DOCUMENTS

CN 203279089 11/2013
EP 0658013 6/1995
(Continued)

OTHER PUBLICATIONS

Suzuki et al, "Design of Tunnel Relay System with a Leaky Coaxial Cable in an 800-MHz band land mobile telephone system", IEEE Transactions of vehicular technology, IEEE Service Center, Piscataway, NJ, US vol. 29, No. 3, Aug. 1980 (Aug. 1, 1980), pp . 305-316, XPO011486786. (Year: 1980).*
(Continued)

*Primary Examiner* — Yuwen Pan
*Assistant Examiner* — Angelica M Perez
(74) *Attorney, Agent, or Firm* — McAndrews, Held & Malloy, Ltd.

(57) ABSTRACT

A communication system and method for vehicles, particularly trains, are described with the vehicle having antenna sets. Each antenna set includes a plurality of antennas mounted onto a convex-shaped vehicle roof in which an axis of one antenna set is approximately perpendicular to an axis of another antenna set and in which the antenna sets are mounted below roof level of the convex-shaped vehicle roof A switching device is operable to switch between a first antenna configuration and a second antenna configuration based on a difference in measured signal power received at the antenna sets. The first antenna configuration is associated with a first stationary communication system of the plurality of stationary communication systems and a second antenna configuration is associated with a second stationary com-
(Continued)

munication system of the plurality of stationary communication systems.

16 Claims, 3 Drawing Sheets

Related U.S. Application Data continuation of application No. 15/142,412, filed on Apr. 29, 2016, now Pat. No. 10,601,109.

(51) Int. Cl.
*H01Q 1/50* (2006.01)
*H01Q 13/20* (2006.01)
*H01Q 21/24* (2006.01)
*H04B 5/00* (2006.01)

(52) U.S. Cl.
CPC ........... *H01Q 13/203* (2013.01); *H01Q 21/24* (2013.01); *H04B 5/0018* (2013.01)

(58) Field of Classification Search
CPC .... H01Q 21/24; H01Q 5/0018; H04B 7/0404; H04B 7/0408; H04B 7/0413; H04B 7/10; H04B 7/1555; H04B 7/024; B61L 1/181; B61L 15/0027; B61L 27/70; H04W 84/005; H04W 88/085
See application file for complete search history.

(56) References Cited

U.S. PATENT DOCUMENTS

| | | | |
|---|---|---|---|
| 7,372,911 B1 * | 5/2008 | Lindskog | H04B 7/0617 375/267 |
| 7,515,051 B2 | 4/2009 | Wagner | |
| 7,768,952 B2 | 8/2010 | Lee | |
| 10,305,198 B2 * | 5/2019 | Schleef | H01Q 1/007 |
| 10,601,109 B2 | 3/2020 | Jamaly | |
| 11,362,414 B2 * | 6/2022 | Jamaly | H01Q 13/203 |
| 2007/0013593 A1 * | 1/2007 | Zafar | H01Q 21/28 343/700 MS |
| 2011/0298669 A1 * | 12/2011 | Rao | H01Q 1/243 343/893 |
| 2013/0064151 A1 | 3/2013 | Mujtaba | |
| 2014/0198715 A1 | 7/2014 | Zasowski | |

FOREIGN PATENT DOCUMENTS

| | | |
|---|---|---|
| EP | 1830485 | 9/2007 |
| EP | 2755440 | 7/2014 |
| JP | 2010-288057 | 12/2010 |

OTHER PUBLICATIONS

Plattner et al.,"A Millimetrewave Communication System for Maglev Application", Vortrag AUF DEM IEEE German Chapter Workshop, XX,XX, Jan. 1, 1982 (Jan. 1, 1982), pp. 1-8, XP002043527. Design (Year: 1982).*

European Patent Office, Communication with extended European search report in Application No. 15165768.1-1812, dated Nov. 4, 2015 (7 pages).

Plattner A: "A Millimetrewave Communication System for Maglev Application", Vortrag Auf Dem IEEE German Chapter Workshop, XX, XX, Jan. 1, 1982 (Jan. 1, 1982), pp. 1-08, XP002043527.

Suzuki T et al: "Design of a tunnel relay system with a leaky coaxial cable in an 800-MHz band land mobile telephone system", IEEE Transactions on Vehicular Technology, IEEE Service Center, Piscataway, NJ, US, vol. 29, No. 3, Aug. 1, 1980 (Aug. 1, 1980), pp. 305-316, XPO11486786, ISSN: 0018-9545, DOI : 10.1109!T-VT.1980. 23858.

* cited by examiner

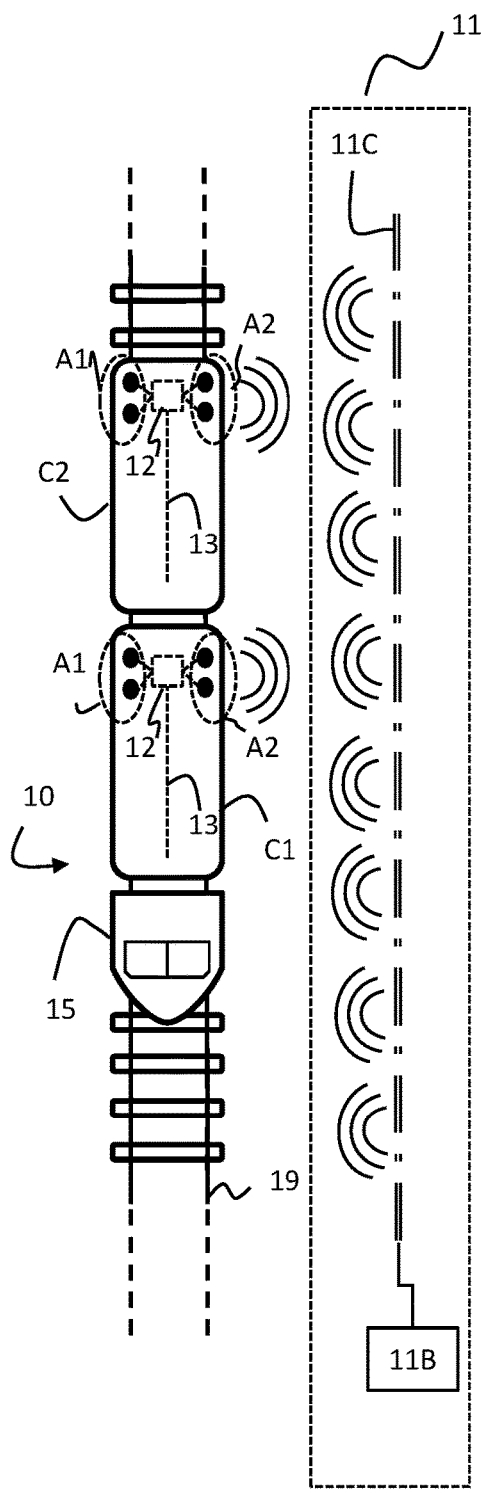
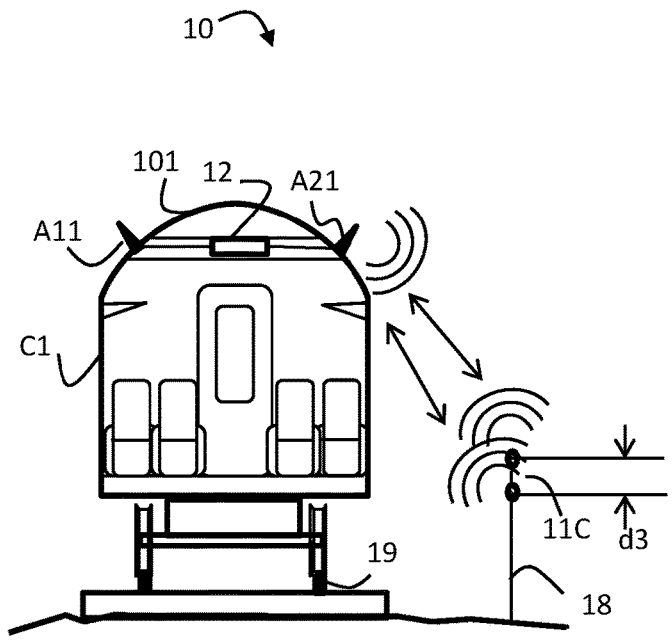
FIG. 2A
FIG. 2B

ANTENNA SYSTEM FOR VEHICLES

CROSS-REFERENCE TO RELATED APPLICATIONS/INCORPORATION BY REFERENCE

This patent application is a continuation of U.S. application Ser. No. 16/827,889, filed Mar. 24, 2020, which is a continuation of U.S. application Ser. No. 15/142,412, filed Apr. 29, 2016 (U.S. Pat. No. 10,601,109), which claims the benefit from and priority to European Patent Application No. EP15165768, filed on Apr. 29, 2015. The aforementioned documents are hereby incorporated herein by reference in their entirety.

TECHNICAL FIELD

The present disclosure generally relates to the field of communications and, in particular, to a system and a method that establishes wireless communication between a moving vehicle following a predefined path or track and base stations located along such a track.

BACKGROUND

The widespread use of mobile communication devices for wireless data communication has made it a great challenge for manufacturers and operators of telecommunications networks to provide wireless data communication with sufficient bandwidth and broadband capacity. In particular, communication related issues can arise in transportation related use scenarios. For example, on a train where typically a large number of users attempt to simultaneously use broadband data communication services through the same limited number of base stations in range of the train, it can be very difficult to provide sufficient data communication capacity for a passing train. Moreover, the tremendous increase of the speed of trains has accentuated this problem since data communication resources need to be provided very quickly, with great bandwidth and broadband capacity, and for very short periods of time.

Considering that modern high-speed trains or cars can travel at approximately 200 km/h or more, a customer's connection can be transferred to a new mobile network cell every 20 seconds, for example. Such rapid cell changes with many mobile communication users in a train pose a major technical challenge and call for different communication systems to cover an entire track. In such circumstances, it is desirable to provide a fast and reliable switching system and method.

BRIEF SUMMARY

A system and/or method is provided for improved antenna switching in mobile communications for vehicles, substantially as shown in and/or described in connection with at least one of the figures, and as set forth more completely in the claims.

These and other advantages, aspects, and novel features of the present disclosure, as well as details of an illustrated embodiment thereof, will be more fully understood from the following description and the attached drawings as listed below.

BRIEF DESCRIPTION OF THE DRAWINGS

FIG. 2A shows a train in the vicinity of a second stationary communication system according to an embodiment of the present disclosure.

FIG. 2B shows a schematic cross-section of the train in FIG. 2A according to an embodiment of the present disclosure.

DETAILED DESCRIPTION

Figure 1A:
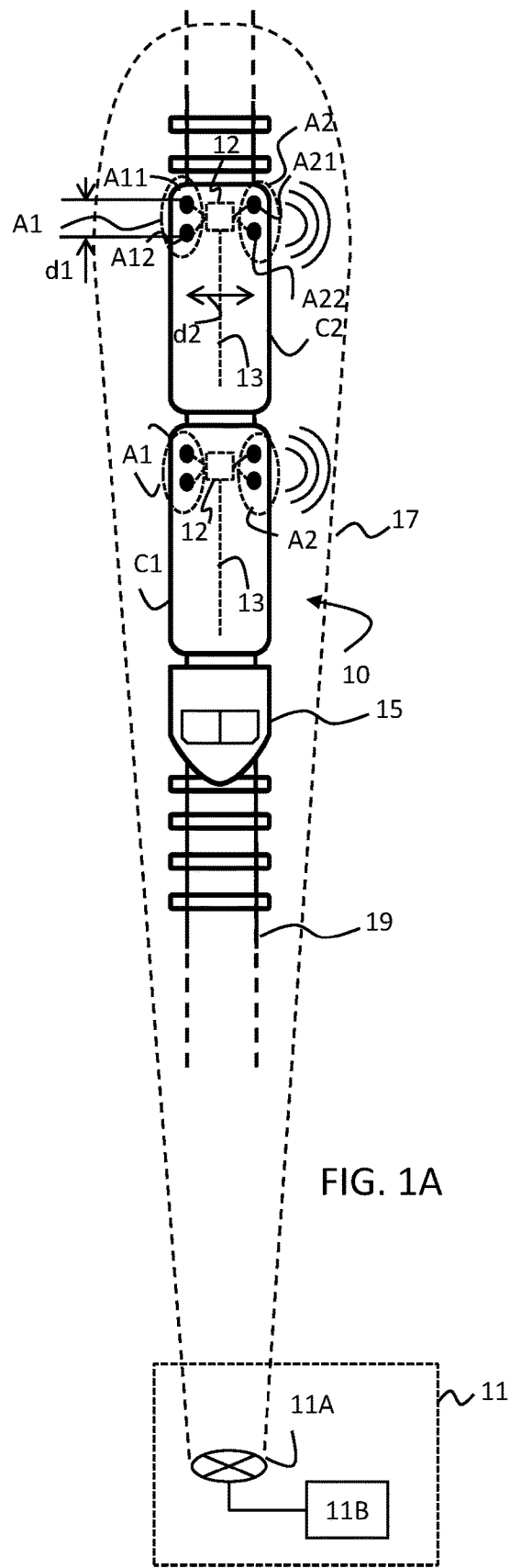
FIG. 1A shows a train in the vicinity of a first stationary communication system according to an embodiment of the present disclosure.

FIG. 1A is a diagram illustrating schematically a top view of a moving train moving in the vicinity of a transceiver station. Referring to FIG. 1A, there is shown a train 10 comprising a locomotive 15 and a number of coaches, of which coaches C1 and C2 are illustrated. The train 10 is on railroad tracks 19. There is further shown a transceiver station 11 comprising a transceiver 11B communicatively coupled to an antenna system 11A. The antenna system 11A can generate an illustrative radiation pattern, referred to as an RF antenna corridor 17. A coach C1, C2 can comprise an interior antenna 13, a signal repeater 12, a set of antennas A1, and a set of antennas A2. The set of antenna A1 can comprise a plurality of antennas, of which two, A11 and A12, are illustrated as black dots. The set of antennas A2 similarly comprises a plurality of antennas, of which two, A21 and A22, are illustrated as black dots. The antennas A11 and A12 are separated by a distance d1. Similarly, the antennas A21 and A22 are separated by the distance d1. The sets of antennas A1 and A2 are separated by a distance d2, as illustrated by the distance d2 between antennas A12 and A22. Generally, the antennas of one set are mounted on opposite sides of the vehicle with respect to those of the other set. In FIG. 1A, the antennas A11 and A12 of the set A1 are mounted on the right side (in direction of travel) while the antennas A21 and A22 of the set A2 are mounted on the left side. The signal repeater 12 is communicatively coupled to the interior antenna 13 and to the sets of antennas A1 and A2.

The train 10 is powered by the locomotive 15 which is mechanically coupled to the coaches C1, C2 as illustrated and moves the train 10 towards (as shown) or away from the transceiver station 11 along the railroad track 19.

The transceiver station 11 can be operable to transmit and/or receive radio frequency signal in accordance with one or more RF technologies, for example, mobile communication standards such as GSM, UMTS, WCDMA, 4G, LTE, HSDPA, HSUPA, 5G, and WiMAX 802.16. The transceiver station 11 can also be referred to as a base station or Node B in accordance with various embodiments of the present disclosure. The transceiver station 11 comprises a transceiver 11B, which comprises suitable logic, circuitry, and/or code to generate and process radio and/or baseband signals in accordance with mobile communication standards. The signals received and/or generated at the transceiver 11B, respectively, are then transmitted/received through the antenna system 11A. The antenna system 11A can comprise one or more antennas in general, but can typically comprise a plurality of antennas to allow various protocols of multiple-input multiple-output (MIMO) communication such as 2×2 communication with a mobile transceiver system such as those installed in the train coaches C1, C2, for example. For example, antenna system 11A can be configured to receive and transmit a cross-polarized signal, i.e., receive and transmit two signals concurrently that are polarized differently, for example, horizontally and vertically. The antenna system 11A can also be suitably configured to support other MIMO schemes in accordance with various embodiments of the present disclosure. The antenna system 11A can be configured such that it receives and transmits favorably along the railroad tracks 19. Such a favorable reception/transmission area is illustrated by the exemplary RF antenna corridor 17.

The coaches C1, C2 can be adapted to any purpose including, but not limited to, the carriage of persons and/or goods. The interior antenna 13 can comprise suitable logic, circuitry, and/or code to receive and transmit radio frequency signals to mobile transceivers typically located inside the carriage (not shown), for example, inside the carriages C1, C2, in which interior antennas 13 are located. The mobile transceivers receiving from or transmitting to the interior antennas 13 can be mobile handsets or computers operated by train passengers, or can be machine-operated mobile communication transceiver such as those used for machine-to-machine communications, for example. The interior antenna 13 is typically placed in the interior of a carriage and can comprise any type of RF antenna type suitable for its operating frequencies. This can include printed antennas, leaky feeders, or any other antenna technology adapted to a mobile communications technology.

The signal repeater 12 can comprise suitable logic, circuitry, and/or code to process radio signals received from the interior antenna 13 or the sets of antennas A1, A2. Moreover, the signal repeater 12 can be operable to control, configure, and adapt the configuration of the sets of antennas A1 and A2. Similarly, the signal repeater 12 is operable to process radio signals for transmission over the interior antenna 13 or the sets of antennas A1, A2. Typically, in a downlink scenario, a signal repeater 12 can receive radio signals transmitted from the transceiver station 11 via one or more of the antenna sets A1, A2. The signals can then be processed for retransmission over the interior antenna 13. The reprocessing can comprise, but is not limited to, amplifying, decoding, and/or re-encoding of the radio signal and can be at radio frequency, intermediate frequencies, or baseband frequencies in accordance with various embodiments of the present disclosure. Similarly, in an uplink scenario, the signal repeater 12 can receive radio signals on the interior antenna 13 and process these suitably for transmission via the sets of antennas A1, A2 to a receiver, for example, transceiver station 11.

The set of antennas A1, A2 can comprise suitable logic, circuitry, and/or code to receive and transmit radio signals in accordance with a radio communications protocol suitable for reception from and transmission to a transceiver station 11. This can, as described above for transceiver station 11, typically comprise one or more mobile communications protocols/standards. The set of antennas A1, A2 can be operable to utilize multiple antenna protocols, for example, MIMO, using the exemplary plurality of antennas A11, A12 and A21, A22, respectively. The antennas A11, A12, A21, A22 can comprise suitable logic, circuitry, and/or code to receive and transmit radio frequency signals at their respective operating radio frequency.

In many instances, the transceiver antenna system 11A can be located approximately along the railroad track 19, typically at a height greater than that of the train 10. Choosing a height of the antenna system 11A greater than the train can improve an effective transmission and reception range of the transceiver station 11 and, furthermore, often result in a line-of-sight (LOS) signal reception/transmission between the sets of antennas A1, A2 and the transceiver antenna system 11A.

Figure 1B:
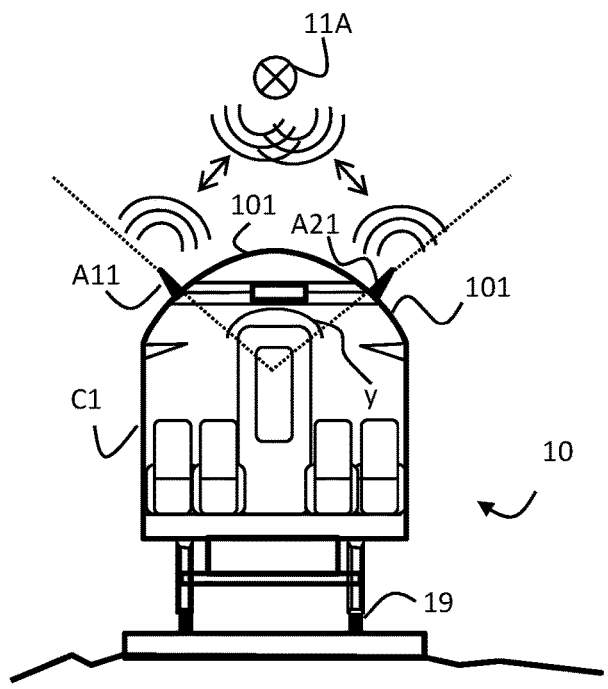
FIG. 1B shows a schematic cross-section of the train in FIG. 1A according to an embodiment of the present disclosure.

FIG. 1B shows an exemplary schematic cross-section of the train in FIG. 1A. Referring to FIG. 1B, there is shown a coach C1 of a train 10 on a railway track 19 and an illustrative transceiver antenna system 11A. The cross-section of the coach C1 further shows an antenna A11 and an antenna A21. The antenna A11 is, for example, part of the antenna set A1 as shown in FIG. 1A. The antenna A21 is, for example, part of the antenna set A2 as shown in FIG. 1A. There is further shown a train roof 101, which is typically made of an electrically conducting material, e.g., metal. There is also shown an angle y between some axis of antennas A11 and antenna A21, due primarily to the location and orientation of the antennas A11 and A21 on the roof 101. The orientations of the antennas of a set can also be regarded as the orientation of the set itself. The reference numbers used in FIG. 1B correspond to the respective elements shown and described for FIG. 1A. As illustrated, a transceiver antenna system 11A of the stationary communication system can be located at a height greater than height of the train 10.

The train roof 101 can typically be curved (or arched) or otherwise be of a convex shape as seen in the exemplary cross-section of FIG. 1B. For example, the roof 101 can be convex, but approach a curved roof 101 as illustrated through a plurality of straight segments. The angle y can advantageously be chosen to be close to 90 degrees and can, in practice, be approximately 75-100 degrees. In this exemplary configuration with an angle y of approximately 90 degrees, the antennas A11 and A21 can be operable to receive and transmit RF fields that can be cross-polarized. For example, antenna A11 can receive primarily a vertically polarized signal component of a transmitted cross-polarized RF signal from the transceiver antenna system 11A, and antenna A21 can receive primarily a horizontally polarized signal component of a transmitted cross-polarized RF signal from the transceiver antenna system 11A. The conductive roof can act as ground plate of the antennas. Such an arrangement can similarly be used to transmit a cross-polarized signal via antennas A11 and A21.

As mentioned above, in a scenario as illustrated in FIG. 1A and FIG. 1B, a strong LOS signal path can often exist between the transceiver antenna system 11A and the sets of antennas A1 and A2. The antennas A11 and A12 can receive a substantially same signal slightly phase-shifted (e.g., delayed) due to the separation d1 of the antennas A11 and A12. The phase shift between the signals received at A11 and A12 can depend on the separation distance d1 between A11 and A12, as well as the geometric position of the set of antennas A1 with regard to the transceiver antenna system 11A. The received signals at A11 and A12 can be coherently combined to constructively add both received signals. In some cases, a delay line, possibly adaptive, can be used to compensate the phase-shift incurred between the received signals at antennas A11 and A12. In other cases, it can suffice to simply connect the antennas A11 and A12 and, in particular, when the delays between the received signals can be relatively small. Similarly, the received signals at antennas A21 and A22 can be combined.

The distance d2 between the sets of antennas A1 and A2 can typically exceed d1 and can depend on the particular shape of the coach roof 101 and the specific antenna arrangement chosen. For this reason and the angular positioning of antennas (as illustrated by angle y), the received signals at the set of antennas A1 and A2 can be approximately uncorrelated and can be used in a variety of multiple antenna protocols, including MIMO. For example, by coherently combining the antennas signals within each set as described above, there will be two effective antennas, one each for the set of antennas A1 and A2. If, for example, the transceiver antenna system 11A employs two cross-polarized antennas, an effective 2×2 MIMO channel can be created between a coach (e.g., coach C1) and the transceiver antenna system 11A.

FIG. 2A shows an example of a train in the vicinity of a second stationary communication system. Referring to FIG. 1B, there is shown a train 10, railroad tracks 19, and a transceiver station 11. The transceiver station 11 can comprise a transceiver 11B communicatively coupled to an antenna system 11C. The antenna system 11C can comprise a plurality of leaky feeder cables, sometimes also referred to as cable antennas, illustrated by the dot-dashed double line. The reference numbers in FIG. 2A can refer to substantially similar elements with the same numbers as described for FIG. 1A.

The leaky feeders in antenna system 11C can be operable to transmit and/or receive radio frequency signal in accordance with one or more RF technologies, for example, mobile communication standards such as GSM, UMTS, WCDMA, 4G, LTE, HSDPA, HSUPA, 5G, and WiMAX 802.16. The leaky feeder cables of antenna system 11C can run approximately parallel to the railroad track 19.

FIG. 2B shows an exemplary schematic cross-section of the train in FIG. 2A. Referring to FIG. 2B, there is shown a train 10 and a transceiver antenna system 11C. The transceiver antenna system 11C can comprise a plurality of leaky feeder cables, of which two are illustrated as dots, mounted on a mount 18. There is also shown a leaky feeder separation distance d3. The reference numbers in FIG. 2B can refer to substantially similar elements with the same numbers as described for FIG. 1A, FIG. 1B, and FIG. 2A.

The mount 18 can be enabled to mount the leaky feeder cables of transceiver antenna system 11C in a desirable position with respect to the railroad track 19. For example, as illustrated in FIG. 2B, the mount 18 can mount the plurality of leaky feeder cables at a certain height above the ground and/or relative to the coach C1, and substantially parallel to the railroad track 19. Furthermore, the mount 18 can allow the single leaky feeder cables to be mounted at a desirable separation distance d3 to each other.

As illustrated in FIG. 2B, when the transceiver station 11 is transmitting to the coach C1 (or any other coach of train 10), the leaky feeder cables of antenna system 11C can typically be mounted lower than the height of the train coach roof 101, i.e., below roof level. In this scenario, there can often be line of sight from the antenna system 11C to the set of antennas mounted on the side of the train that is physically closer to the antenna system 11C. In the illustrated example in FIG. 2B, this is the set of antennas A2. In such a scenario, the antennas A21 and A22 can receive most of the energy transmitted from the transceiver antenna system 11C. On the other hand, the antennas on the side of the coach farther away from the leaky feeder cables will receive significantly weaker signals. In this example, the antennas A11 and A12 will receive less signal power than the antennas A21 and A22. Because of the radiation characteristics of the leaky feeder cables of antenna system 11C, the signals received at antennas A21 and A22 can be uncorrelated and hence allow a variety of MIMO schemes to be applied. A suitable MIMO scheme can, for example, be a 2×2 MIMO scheme as proposed in the LTE mobile communication standard. The above scenario is also applicable to the scenario in which the antenna systems A1, A2 from the coach are transmitting to the transceiver system antennas 11C, as well as to the case in which the leaky feeder cables are located on the other side of the railroad track 19.

The transceiver antenna system 11C, specifically, the leaky feeder cables, can be installed on either side of the railroad track 19. From the above-described reception characteristics, it can be advantageous to communicatively couple the antennas A11 and A21 and A12 and A22, respectively. In this case, two effective antennas can be formed, a first one from the coupled antennas A11 and A21, and a second one from the coupled antennas A12 and A22. These two effective antennas based on the physical antennas A11, A12, A21 and A22 can be used to receive and/or transmit from leaky feeder cables of the transceiver antenna system 11C installed on either side of the railroad track 19. In other words, such a configuration can be operated without regard to the side of the track 19 on which the leaky feeders are located.

Figure 3:
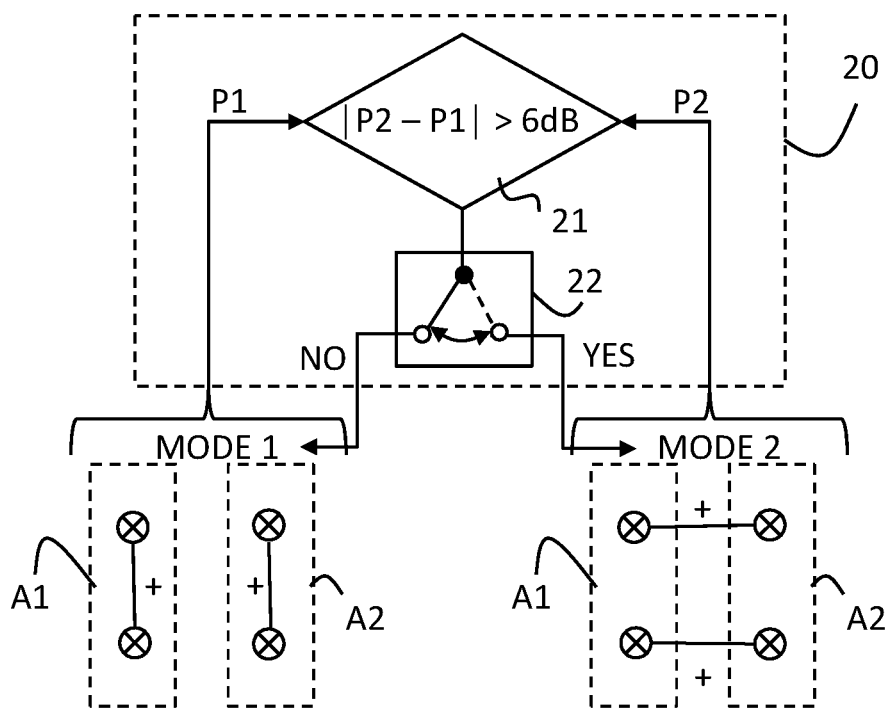
FIG. 3 illustrates a switching and control scheme for a vehicle-based antenna system according to an embodiment of the present disclosure.

FIG. 3 illustrates a switching and control scheme for a vehicle-based antenna system in accordance with an embodiment of the present disclosure. Referring to FIG. 3, there is shown a switching device 20 which can be integrated within the signal repeater 12 as shown in FIG. 1A, FIG. 1B, FIG. 2A, and/or FIG. 2B, an antenna configuration MODE 1, and an antenna configuration MODE 2. The switching device 20 can comprise a comparator 21 and the switch 22. The antenna configuration MODE 1 can comprise antennas A11, A12, A21 and A22, whereby antennas A11 and A12, and antennas A21 and A22 can be communicatively coupled, respectively, with each pair of coupled antennas forming a single effective antenna. The antenna configuration MODE 2 can comprise antennas A11, A12, A21 and A22, whereby antennas A11 and A21, and antennas A12 and A22 can be communicatively coupled, respectively, with each pair of coupled antennas forming a single effective antenna. There is also shown a signal power of the set of antennas A1 and A2, denoted by P1 and P2, respectively. The reference numbers in FIG. 3 can refer to substantially similar elements with the same numbers as described in FIG. 1A, FIG. 1B, FIG. 2A, and FIG. 2B.

The switching device 20 or the signal repeater 12 can, in addition to the functionality already described above, comprise suitable logic, circuitry, and/or code to compare a plurality of signal powers and control a plurality of possible antenna configuration modes, for example, MODE 1 and MODE 2. The comparator 21 can comprise suitable logic, circuitry, and/or code to compare the signal power of a plurality of input signals and to operate the switch 22. The switch 22 can comprise suitable logic, circuitry, and/or code to be operable to switch between a plurality of configurations and/or signal paths between one or more inputs and one or more outputs.

Along a railroad track 19, both scenarios of a transceiver station 11 with a transceiver station antenna system 11B, as described in FIG. 1A and FIG. 1B, or with a transceiver station antenna system 11C, as described in FIG. 2A and FIG. 2B can be employed on different segments of the railroad track 19. The selection of an antenna system can depend on, among other factors, terrain, cost, ease of installation, and/or required throughput. Accordingly, it can be desirable to adapt the vehicle-based configuration to be operable with both transceiver station antenna systems 11B and 11C.

As described with respect to FIG. 1A and FIG. 1B, in a scenario using a transceiver antenna system 11B, it can be advantageous to communicatively couple the antenna pairs A11, A12 and A21, A22, respectively, to form two effective antennas. In some cases, the antenna pairs can, as described above, be communicatively coupled such that a phase-delay between the coupled antennas can be approximately compensated to form a single effective antenna. This is referred to as antenna configuration MODE 1. Similarly, in a scenario using a transceiver antenna system 11C, it can be advantageous to communicatively couple the antenna pairs A11, A21 and A12, A22, respectively. This is referred to as antenna configuration MODE 2.

When a transceiver antenna system 11B is used for a particular segment of the railroad track 19, the received signal power from the transceiver 11 of the set of antennas A1 and the set of antennas A2 is similar in antenna configuration MODE 1. Hence, the antenna configuration MODE 1 can remain active and can be advantageous, as described for FIG. 1A and FIG. 1B. On the other hand, in antenna configuration MODE 1, when a transceiver antenna system 11C is used for a particular segment of the railroad track 19, the received signal power from the transceiver 11 by the set of antennas A1 and the set of antennas A2 is significantly different. In particular, as described for FIG. 2A and FIG. 2B, the set of antennas on the side of the coach that is closer to the antenna system 11C can receive significantly higher signal power than the other set of antennas. For example, as illustrated in FIG. 2B, the set of antennas A2 would receive significantly higher signal power than the set of antennas A1 because the set of antennas A2 is physically closer to the transceiver antenna system 11C, whereas the set of antennas A1 might be out of sight of the transceiver antenna system 11B and electromagnetically shielded partially by the presence of the train roof 101. Thus, in a scenario where a transceiver antenna 11C is active, it can be advantageous to switch from antenna configuration MODE 1 to antenna configuration MODE 2, as described above with reference to FIG. 2A and FIG. 2B. The comparison of the respective signal powers can be performed in the comparator 21 and be a basis by which the switch 22 is operated. In accordance with various embodiments of the present disclosure, the comparison of the signal powers and the switching between antenna configuration modes can be integrated into the signal repeater 12, or performed in another equipment, for example, a dedicated hardware switching device 21 not integrated into the signal repeater 12.

Thus, the signal powers of the sets of antenna A1 (signal power P1), and A2 (signal power P2) can be compared in antenna configuration MODE 1. If the signal power P1 is substantially similar to the signal power P2, the antenna configuration MODE 1 might be desirable and hence no antenna configuration change is necessary. On the other hand, if the signal power P1 is substantially different from the signal power P2, the antenna configuration MODE 2 might be desirable and the vehicle-based antenna system can switch from antenna configuration MODE 1 to antenna configuration MODE 2. In a typical train system, an exemplary threshold to change antenna configuration mode from MODE 1 to MODE 2 can be a power difference of approximately 6 dB. As will be known to a person skilled in the art, the threshold value is exemplary and can depend on a wide variety of factors in a particular communication system. Moreover, the threshold value can be adaptively changed in some scenarios. In the present example, if the difference in signal power P1 to P2 is less than or equal to 6 dB, the antenna configuration remains or changes back to MODE 1. On the other hand, if the difference in signal power P1 to P2 exceeds 6 dB, the antenna configuration changes from MODE 1 to MODE 2 or remains in MODE 2 depending on the prior status.

In accordance with various embodiments of the present disclosure, it is also possible in the above switching scheme to compare the signal power of one antenna each from the sets of antennas A1 and A2, instead of the set powers as described above. For example, the power at antenna A11, P(A11), and the power at antenna A21, P(A21), can be used to determine a switching condition. Similarly, the pair P(A11), P(A22), the pair P(A12), P(A21), and the pair P(A12), P(A22) can be used to determine a switching condition, for example. It is also possible to further refine the comparison, for example, by taking into account which of the powers P1 and P2 are larger to determine the side of track on which the leaky feeder is located. In such a case, the switching can be adapted to establish the communication link only through antennas located on the respective side of the vehicle.

The above-described compare and switch scheme can be applicable to a comparison of any measure related to signal power or amplitudes, mean amplitudes, etc. reasonably related to the signal power at the relevant antennas or sets of antennas. This includes, but is not limited to, averaged values, correlated values, and/or peak/trough analysis of such measures.

Though described using a train 10 as an example, the systems and methods described above can be applied in any communication system using fast switching of in-vehicle equipment between two or more different stationary communications systems along the trajectory of the vehicle. The vehicle can be a coach of a train, the train itself, or a different type of vehicle such as guided bus, a car, etc.

The distance d1 between the two antennas of each set A1, A2 can be the order of half the wavelength of the center frequency of the communication link or larger. The same applies to the distance d3 between the signal cables of the leaky feeder 11C antennas.

What is claimed is:

1. A system, comprising:
   a first antenna device comprising a first plurality of antennas;
   a second antenna device comprising a second plurality of antennas; and
   a switch, wherein:
   the switch is operable to couple the first antenna device to the second antenna device, via a physical connection, for a first kind of wireless communication system,
   the switch is operable to decouple the first antenna device from the second antenna device, thereby removing the physical connection, for a second kind of wireless communication system, and
   a determination between the first kind of wireless communication system and the second kind of wireless communication system is based on a first signal power received at the first antenna device and a second signal power received at the second antenna device.

2. The system according to claim 1, wherein the first antenna device is mounted to a vehicle.

3. The system according to claim 2, wherein the vehicle is one of a train, a bus, and a car.

4. The system according to claim 1, wherein the first antenna device and the second antenna device are configured to establish a 2×2 communication link with a stationary transceiver system.

5. The system according to claim 1, wherein the first kind of wireless communication system is configured to form a single effective antenna by communicatively coupling antennas from the first antenna device and the second antenna device.

6. The system according to claim 1, wherein two or more antennas of the first antenna device and the second antenna device are separated by a half wavelength of a communication frequency.

7. The system according to claim 1, wherein the switch is operable to switch between the first antenna device and the second antenna device.

8. The system according to claim 1, wherein an axis of the first antenna device is perpendicular to an axis of the second antenna device.

9. The system according to claim 1, wherein the second kind of wireless communication system is configured to form a plurality of effective antennas.

10. The system according to claim 1, wherein signals received from the first kind of wireless communication system via the first antenna device are coherently combined.

11. The system according to claim 1, wherein signals received via the first antenna device and the second antenna device are uncorrelated.

12. The system according to claim 1, wherein the switch is part of a repeater.

13. The system according to claim 1, wherein the system is a vehicle.

14. The system according to claim 13, wherein the vehicle is one of a train, a bus, and a car.

15. The system according to claim 1, wherein the first kind of wireless communication system is operable to provide cross-polarized communication.

16. The system according to claim 1, wherein the second kind of wireless communication system comprises two or more leaky feeders.

* * * * *